United States Patent Office 3,173,834
Patented Mar. 16, 1965

3,173,834
2 - TRICHLOROMETHYLSULFENYLETHYLTHIO-
METHYLETHYLENE - 1,2-BIS(TRICHLOROMETH-
YLSULFENATE) AS FUNGICIDE AND BACTER-
IOSTAT
Arthur M. Imel, Jr., Box 14, Walterville, Oreg., and
Thomas B. Williamson, 1844 Graham Lane, Santa
Clara, Calif.
No Drawing. Filed Jan. 22, 1964, Ser. No. 339,361
1 Claim. (Cl. 167—22)

This invention relates to a certain organic sulfenate and its use in microbiocidal compositions. In particular, it relates to the compound corresponding to the formula $$Cl_3CSOCH_2CH_2SCH_2CHOSCCl_3$$
$$|$$
$$CH_2OSCCl_3$$

2 - trichloromethylsulfenylethylthiomethylethylene - 1,2-bis(trichloromethylsulfenate). The compound is valuable for its microbiological activity.

The compound of the present invention can be prepared by the reaction of mercaptoethanol and 3-chloro-1,2-propanediol to prepare the intermediate 3-(2-hydroxyethylthio)-1,2-propanediol. This is followed by the reaction of 1,1,1-trichloromethyl sulfenyl chloride with the aforedescribed propanediol in the presence of an acid acceptor, such as triethylamine.

Reference is now made to the following non-limiting example which illustrates the preparation of the compound of the present invention.

EXAMPLE

*Preparation of 3-(hydroxyethylthio)-1,2-propanediol.*—Mercaptoethanol 23.4 g. (0.3 mole) was dissolved in ethanol and 16.5 cc. of 48% sodium hydroxide solution (0.3 mole) was next added with continued stirring. The mixture was held at reflux for at least two hours. The ethanol was removed by evaporation on a steam bath. Water was added to the resulting residue to dissolve the salt and the undissolved oily product was extracted with ether. The ether layer after drying over anhydrous magnesium sulfate was concentrated on a steam bath. There was obtained 43.7 g. (96% of theory) of 3-(2-hydroxyethylthio)-1,2-propanediol, a yellow oil, $n_D^{30}$=1.5273.

*Preparation of 2-trichloromethylsulfenylethylthiomethylethylene-1,2-bis(trichloromethylsulfenate).*—In 100 cc. of dioxane was dissolved 15.2 g. (0.1 mole) of the propanediol. The solution was cooled in crushed ice and 55.7 g. (0.3 mole) of 1,1,1-trichloromethyl sulfenyl chloride was added with stirring. This was followed by the dropwise addition of 30.4 g. (0.3 mole) of triethylamine while keeping the temperature at about 10° C. The mixture was stirred for 1½ hours at 10° C., 30–45 minutes at room temperature. The reaction mixture was then poured into crushed ice-water. The red oily product was extracted with carbon tetrachloride and dried over anhydrous magnesium sulfate. After removal of the carbon tetrachloride there was obtained 25.3 g. (42.3% of theory) of the tris-sulfenate, as a bright red oil, $n_D^{30}$=1.5700.

The compound prepared by the aforedescribed procedure was tested as a fungicide according to the following methods.

*In vitro evaluation test.*—The compound was tested against growing fungi and bacteria in an artificial medium. Fungi and bacteria are tested in vitro starting with 3 1-ounce vials partially filled, two (2) with malt broth and one (1) with nutrient broth. The compound to be tested is placed in the vials at any desired concentration (expressed in parts per million (p.p.m.)) and mixed with the broth. The vials are inoculated with a water suspension of spores of the desired fungi and cells of the bacteria (one organism per vial). The bottles are then sealed and held for one week, after which time the results are observed and noted. Table 1 contains the data obtained in this manner.

Table 1
IN VITRO VIAL TEST

| Organism | Aspergillus niger | Penicillium sp. | Escherichia coli |
|---|---|---|---|
| Lowest effective concentration (p.p.m.) | (25) | 50 | >50 |

( )=partial control.

*Soil incorporation evaluation test.*—In the soil fungicide incorporation test, activity of the compound was determined against soil-borne pathogenic fungi. Three fungi were used and tested separately, *Rhizoctonia solani, Fusarium solani* and *Pythium ultimum*. Each fungus is added to separate amounts of soil and then 1-pound portions are placed in quart jars. The chemical to be tested is pipetted into the fungus infested soil at rates beginning at 110 p.p.m. and diluting until activity has been lost. Cotton is planted into *Rhizoctonia solani*-infested and treated soil. Beans are planted into *Fusarium solani*-infested and *Pythium ultimum*-infested and treated soils. Three to four weeks later the plants are inspected for disease symptoms. The lowest concentrations which prevent development of disease symptoms are reported. The following results were obtained with the tris-sulfenate of this invention.

Table 2
SOIL FUNGICIDE TEST

| Organism | Rhizoctonia solani | Fusarium solani | Pythium ultimum |
|---|---|---|---|
| Lowest effective concentration (p.p.m.) | (110) | * 2½ | V50 |

( )=partial control.
*=lowest rate tested.

The compound of the present invention finds particular utility as a fungicide and may be applied in a variety of ways at various concentrations. It may be combined with suitable carriers and applied as dusts, sprays or drenches. The amount applied will depend on the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appended claim.

We claim:

The method of inhibiting the growth of fungi and bacteria, comprising applying thereto an effective amount of 2-trichloromethylsulfenylethylthiomethylethylene - 1,2-bis(trichloromethylsulfenate).

References Cited in the file of this patent

UNITED STATES PATENTS

| 2,553,772 | Kittleson et al. | May 22, 1951 |
| 2,553,778 | Hawley | May 22, 1951 |